Dec. 26, 1967 W. C. DILLON 3,359,790
WIRE TENSIONING APPARATUS
Filed May 18, 1965

INVENTOR.
WILLIAM C. DILLON
BY
Elliott & Pastoriza
ATTORNEYS

United States Patent Office 3,359,790
Patented Dec. 26, 1967

3,359,790
WIRE TENSIONING APPARATUS
William C. Dillon, Van Nuys, Calif., assignor to W. D. Dillon & Co., Inc., a corporation of California
Filed May 18, 1965, Ser. No. 456,696
4 Claims. (Cl. 73—143)

ABSTRACT OF THE DISCLOSURE

A wire gripping device including first and second jaws arranged to receive a wire therebetween. Suitable frames mount the jaws and the frame mounting one of the jaws serves additionally to mount eccentric cam means which will cam the jaw towards the other jaw to grip a wire therebetween in response to a pulling force. The pulling force is applied to the second frame and thus to the cam members through a unique pivoted block member such that the pulling force is applied out of alignment with the normal direction of pulling so that the block will tend to rotate when the pulling force is applied. A bending beam in turn is mounted to oppose rotation of this block such that the degree of rotation of the block as provided by a suitable pointer mounted on the second frame indicates the actual pulling force involved.

---

This invention relates generally to tensioning apparatus and more particularly to an improved combination tensioning and tension measuring aparatus for tensioning wires.

In stringing wires and cables such as telephone wires, anchoring wires for towers, and the like, it is desirable to provide a device which is capable of gripping the wire at an intermediate portion as well as at the end to facilitate tensioning the wire. It is also desirable to provide a gripping action which increases automatically with tension in the wire in order that no slippage will occur.

In addition to the above, it is important to avoid the use of any type of wire tensioning device which might injure the wire themselves. Thus, any gripping means employed such as opposed jaw members should grip the wire in a straight line direction preferably normal to the direction of pulling of the wire and any possible sliding movement of one of the jaw members relative to the other which might injure surface insulation on the wire or the wire itself should be prevented.

Another desirable feature is to provide a simple means which will continuously indicate the magnitude of pulling force or tension in the wire so that there will be minimized the risk of exerting a greater tension force on the wire than that for which it is designed.

With the foregoing in mind, it is accordingly a primary object of this invention to provide a wire tensioning and tension measuring apparatus incorporating the above described desirable features.

More particularly, it is an object to provide a wire tensioning apparatus capable of gripping a wire at its end as well as at any intermediate portion without having to remove the apparatus from the wire.

Another object is to provide a wire tensioning apparatus in which the grip on the wire increases with increasing tension in the wire.

Still another important object of this invention is to provide a wire tensioning device incorporating jaw members so designed that the jaw members grip the wire in a straight line gripping action substantially normal to the direction of the pulling force so that no relative sliding movement between the opposed jaw members occurs, all to the end that the risk of damaging the wire is minimized.

Another object is to provide a combination wire tensioning and tension measuring apparatus so that there is provided continuously an indication of the pulling force and thus the tension in the wire.

Briefly, these and many other objects and advantages of this invention are attained by providing upper and lower jaw members preferably in the form of elongated bars for receiving a wire therebetween. The arrangement is such that the wire may be received laterally between the jaw members or one end of the wire may be received between a portion of the opposing surfaces of the jaw members.

The lower jaw member is secured directly to a first frame and the upper jaw member is coupled to the first frame in a manner to constrain it to a vertical movement towards and away from the lower jaw member. A second frame serves to support at one end a coupling means including cam means adapted to cam the upper jaw towards the lower jaw in response to relative movement between the second frame and the first frame. The arrangement is such that the camming force is increased with increased pulling force so that the gripping of the wire increases with increased tension in the wire.

A suitable indicating means is also provided on the second frame and is responsive to the rearward pulling force on the second frame effected during a tensioning operation to provide a continuous indication of the tension in the wire.

A better understanding of the invention will be had by now referring to a preferred embodiment thereof as illustrated in the accompanying drawings, in which.

Figure 1:
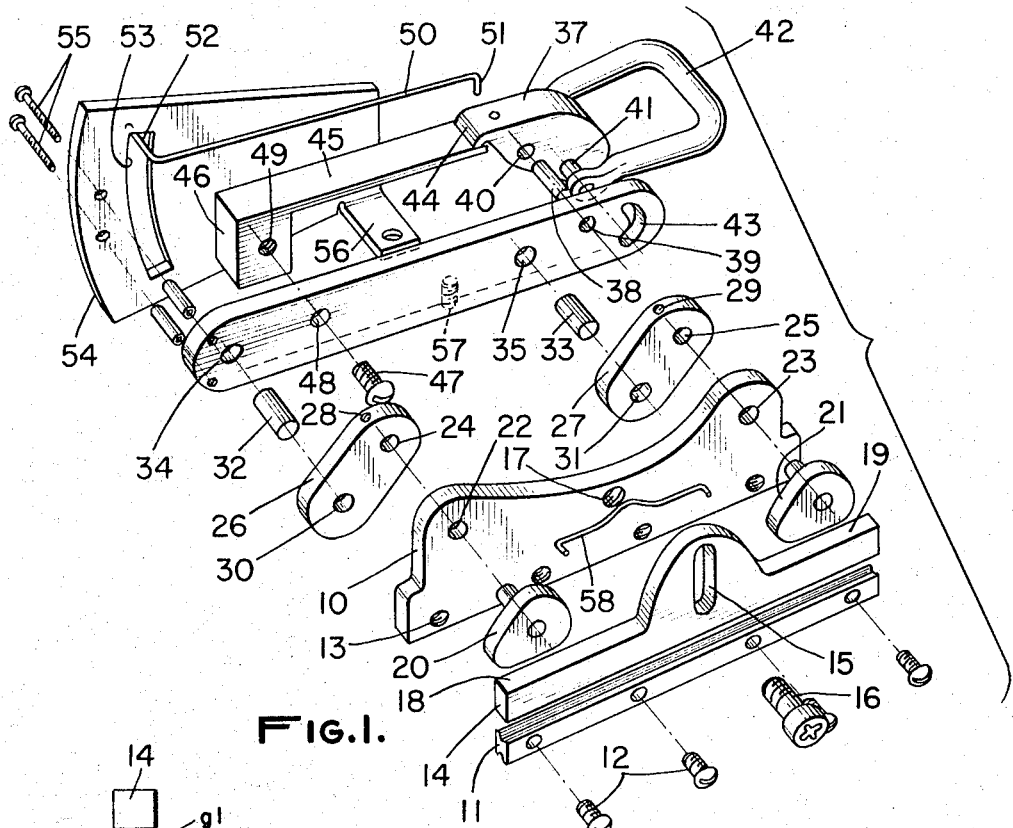
FIGURE 1 is an exploded perspective view showing the basic components making up the wire tensioning and tension measuring apparatus of this invention.

Referring to the lower portion of FIGURE 1, there is shown a first frame 10 for supporting a lower jaw member 11 as by means of screws 12 passing through the lower jaw member and threadedly received in suitable openings 13 along the bottom of the frame 10. Cooperating with the lower jaw 11 is an upper jaw 14 running generally parallel to the lower jaw 11 to define opposed gripping surfaces for receiving a wire.

As shown, the upper jaw member 14 includes a vertical slot 15 for enabling coupling of the upper jaw to the first frame 10 as by means of a screw 16 passing through the slot 15 to a threaded opening 17 in the frame. By this arrangement, the upper jaw 14 is guided for vertical movement relative to the lower jaw 11.

Movement of the upper jaw 14 towards and away from the lower jaw 11 is effected through camming surfaces 18 and 19 on the upper part of the upper jaw on either side of the slot 15 engaged by first and second cam means 20 and 21. The cam means 20 and 21 are eccentrically mounted for rotation within openings 22 and 23, respectively, in the first frame 10.

The cam means themselves are rigidly secured within openings 24 and 25 in end portions of first and second rocking arms 26 and 27. Suitable through pins 28 and 29 lock the shafts of the cams 20 and 21 within the openings 24 and 25 so that rocking movement of the rocking arms 26 and 27 will serve to rotate the cam means, the openings 22 and 23 in the frame 10 serving as journalling openings for rotative movement of the cam means. It will be clear that counterclockwise rotation of the cam means as viewed in FIGURE 1 will cause the lower elongated portions of the cam means to engage the camming surfaces 18 and 19 of the upper jaw member 14 and urge the jaw member down towards the lower jaw member 11.

The other ends of the rocking arms 26 and 27 are provided with openings 30 and 31 receiving pivot pins 32 and 33, in turn, received within openings 34 and 35 in a second frame 36. This second frame 36 is pivoted at its rear end to a block 37 by pivot pin 38 received within the openings 39 and 40 in the second frame 36 and block 37, respectively. A second pivot pin 41 connects an eye 42 to the block 37 at a point below and to the right of the pivot pin 38. The foregoing structure constitutes a connecting means for applying a rearward pulling force on the second frame 36.

When the structure of FIGURE 1 is assembled, the eye 42 passes through the second frame 36, there being provided an arcuate slot 43 for this purpose. Since the pivot point 41 is out of alignment with the pivot pin 38 securing the block 37 to the second frame 36, it will be evident that when a pulling force is applied to the eye 42 in a rearward direction, the block 37 will tend to rotate about the pivot pin 38.

An upper forward end of the block 37 terminates in tip 44 engaging a bending beam 45 extending from a hub 46. The hub 46 is rigidly secured to the second frame 36 as by a screw 47 passing through a suitable opening 48 in the frame and received within the threaded opening 49 in the hub 46. The beam 45 is thus cantilevered from the hub and it will be noted that when the block 37 rotates about the pivot pin 38 to cause the tip 44 to bear against the beam 45, the free end of the beam will oppose with a bending reaction force this rotative movement.

The assembly is completed by a suitable indicating means in the form of a pointer 50 having one end 51 secured directly to the block 37 for movement therewith. The other end of the pointer 50 is illustrated at 52 passing adjacent to a suitable scale 53 provided on a plate 54. The plate 54 is secured to the second frame 36 as by screws 55 and a lower flange 56 having a screw opening for receiving a screw within a lower bore 57 in the second frame 36.

Figure 2:
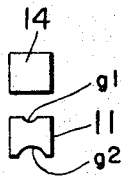
FIGURE 2 is an end view of upper and lower jaw members shown in FIGURE 1.

With reference to FIGURE 2, it will be noted that the lower jaw member 11 includes a first groove g1 on its wire engaging surface for cradling the wire so that when the upper jaw member 14 bears down against the top of the wire, it will be secured between the jaw members. However, in the event different sized wire is used, it is possible to remove the lower jaw member 11 by removing the screws 12 as shown in FIGURE 1 and simply turn the jaw member over so that a wider groove such as indicated at g2 in FIGURE 2 will oppose the lower gripping surface of the upper jaw member 14. Thus, different sized wire may be accommodated by simply reversing the lower jaw member. In addition, jaw members of different thicknesses may be provided to vary the grip accommodation in accordance with the particular wire involved.

Figure 3:
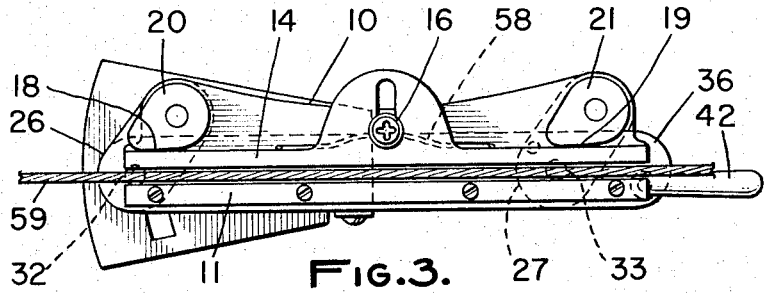
FIGURE 3 is a side elevational view of the wire tensioning apparatus in assembled relationship; and, FIGURE 4 is an elevational view of the opposite side of the apparatus illustrated in FIGURE 3.

FIGURE 3 shows the various components of FIGURE 1 in assembled relationship in addition to illustrating a wire 59 disposed between the lower and upper jaw members 11 and 14. There is also illustrated in FIGURE 3 a hairpin type wire spring 58 which may optionally be provided between the upper jaw 18 and the screw 16 to exert a downward biasing force on the upper jaw and thus tend to bias it into engagement with the wire 59 to hold the wire lightly between the jaw members preparatory to applying a pulling force.

Figure 4:
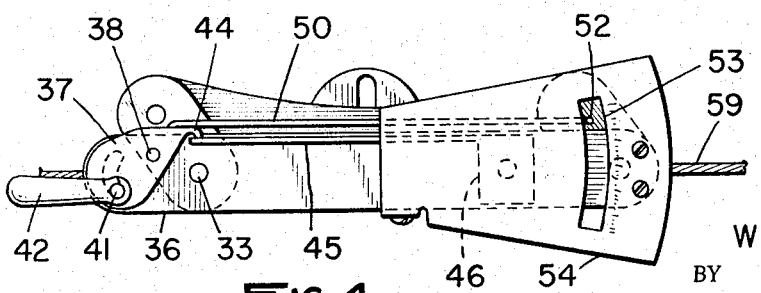

The manner in which the parts of the indicating means described in FIGURE 1 are assembled will be evident in FIGURE 4 wherein the scale 53 is visible on the plate 54.

The operation of the device will be readily understood from the foregoing description of the various components. Thus, with reference first to FIGURE 3, if a pulling force is provided to the right or in a rearward direction on the eye 42, the second frame 36 will move rearwardly relative to the first frame 10. As a consequence, the rocking arms 26 and 27 will tend to rock about the points to which they are secured to the cams 20 and 21 thereby rotating the cams in a counterclockwise direction as viewed in FIGURE 3. Because of the eccentric mounting of the cams, the peripheral lower surface portions thereof will engage the upper surfaces 18 and 19, respectively, of the upper jaw member 14 and urge this jaw member towards the lower jaw member 11. The movement is substantially vertical or normal to the direction of the pulling force as a consequence of the screw 16 riding within the guide slot 15. The wire 59 will thus be securely gripped between the jaw members and since the gripping force is normal to the pulling force, there is no horizontal relative movement between the jaw members and thus the possibility of any damage to the exterior of the wire is minimized.

As the tension on the eye 42 is increased, there will be an increased tendency to rotate the cam members 20 and 21 in a counterclockwise direction, thereby increasing the gripping force on the wire 59.

With reference now to FIGURE 4, which shows the rear of the structure illustrated in FIGURE 3, the pulling force on the eye 42, which will now be to the left as viewed in FIGURE 4, will result in the block 37 tending to rotate about its pivot pin 38 in a clockwise direction. The tip 44 of this block will bear down against the free end of the bending beam 45 and will thus be opposed by the bending reaction force of the beam. The pointer 50, on the other hand, will move with the block 37 so that its extreme indicating end 52 will be juxtaposed certain of the scale markings on the scale 53. Since the degree of rotation of the block 37 and, therefore, the degree of movement of the pointer end 52, is a function of the pulling force on the eye 42, the scale 53 may be calibrated to provide a direct reading of the pulling force and thus the tension in the wire. The sensitivity of the indicator may be changed by substituting a new beam for the beam 45 of different thickness to thereby vary the bending reaction force on the block 37.

Relaxing of the tension force on the eye 42 will very easily permit the second frame 36 to be moved forwardly relative to the frame 10 thereby rotating the cam means 20 and 21 in a clockwise direction and thus relieving the camming force on the upper jaw member 14. The upper jaw member 14 may be easily raised against the bias of the spring 58 to release the wire.

It should be noted with respect to the foregoing that the wire may be inserted laterally between the jaw members so that the intermediate portions of the wire may be gripped. Alternatively, an end of the wire may be fed in between the ends of the jaw members.

From the foregoing description, it will be evident that the present invention has provided a novel wire tensioning and tension measuring apparatus wherein the various objects set forth heretofore are fully realized.

While only one specific embodiment has been shown and described, various changes that fall clearly within the scope and spirit of the invention will occur to those skilled in the art. The apparatus is therefore not to be thought of as limited to the one embodiment set forth merely for illustrative purposes.

What is claimed is:

1. A wire tensioning and tension measuring apparatus comprising, in combination: a first frame; a lower jaw member secured to said first frame; an upper jaw member running generally parallel to and above said lower jaw member to define opposing wire gripping surfaces; guide means coupling said upper jaw member to said first frame for movement toward and away from said lower jaw member to vary the spacing between said wire gripping surfaces; cam means eccentrically mounted for rotation to said first frame and engaging the upper surface of said upper jaw member; a second frame; means eccentrically connecting said cam means to said second frame such that movement of said second frame relative to said first frame in response to a rearward pulling force rotates said cam means to thereby cam said upper jaw down towards said lower jaw; a block pivoted to a rear portion of said second frame at a first point and having a connecting means for exerting said pulling force at a second point out of alignment with the direction of said pulling force so that said block tends to rotate in response to said pulling force; a bending beam secured to a forward portion of said second frame at one end and having a free end engaging said block to oppose rotation of said block; and indicating means including a pointer secured for movement with said block and a scale secured to said second frame adjacent to the free end of said pointer to provide an indication of said pulling force.

2. An apparatus according to claim 1, in which said lower jaw member has grooves of different widths on opposite surfaces, said lower jaw member being removably secured to said first frame so that it may be removed and turned over and then resecured to present a groove of different width in opposing relationship to the gripping surface of said upper jaw member to accommodate a different wire size.

3. An apparatus according to claim 1, including a biasing means for biasing said upper jaw member in a vertically downward direction towards said lower jaw member.

4. An apparatus according to claim 1, in which said cam means include first and second cams and in which said means eccentrically connecting said cam means to said second frame comprises first and second rocking arms having first ends pivoted to said second frame and second ends secured to said cams respectively so that rocking movement of said arms in response to movement of said second frame relative to said first frame rotates said cams.

References Cited
UNITED STATES PATENTS

| | | | |
|---|---|---|---|
| 633,632 | 9/1899 | Wilson | 73—143 |
| 1,449,945 | 3/1923 | Jacobsen | 24—134 |

FOREIGN PATENTS

| | | |
|---|---|---|
| 789,052 | 8/1935 | France. |

RICHARD C. QUEISSER, *Primary Examiner.*

JAMES J. GILL, *Examiner.*

CHARLES A. RUEHL, *Assistant Examiner.*